United States Patent [19]

Lund et al.

[11] Patent Number: 4,997,589
[45] Date of Patent: Mar. 5, 1991

[54] AZEOTROPE-LIKE COMPOSITIONS OF 1,2-DIFLUOROETHANE AND DICHLOROTRIFLUOROETHANE

[75] Inventors: Earl E. A. Lund, West Seneca; Ian R. Shankland, Williamsville; Ellen L. Swan, Ransomville, all of N.Y.

[73] Assignee: Allied-Signal Inc., Morris Township, Morris County, N.J.

[21] Appl. No.: 451,063

[22] Filed: Dec. 15, 1989

[51] Int. Cl.$^5$ .......................... C11D 7/30; C11D 7/50; C09K 5/04; C08J 9/14
[52] U.S. Cl. ........................ 252/172; 62/114; 134/12; 134/38; 134/39; 134/40; 252/69; 252/162; 252/364; 252/DIG. 9; 521/98; 521/131
[58] Field of Search ............... 62/114; 252/67, 69, 252/364, 162, 172, 171, DIG. 9; 521/98, 131; 134/12, 38, 39, 40

[56] References Cited

U.S. PATENT DOCUMENTS

| | | | |
|---|---|---|---|
| 2,101,993 | 12/1937 | Fleischer | 62/178 |
| 2,641,579 | 6/1953 | Benning | 252/67 |
| 3,352,789 | 11/1967 | Degginger | 252/171 |
| 3,940,342 | 2/1976 | Hutchinson | 252/171 |
| 4,173,530 | 11/1979 | Smith et al. | 209/11 |
| 4,303,536 | 12/1981 | Orfeo | 252/67 |
| 4,624,970 | 11/1986 | Dwyer | 521/131 |
| 4,816,175 | 3/1989 | Lund | 252/171 |
| 4,816,176 | 3/1989 | Lund | 252/171 |

FOREIGN PATENT DOCUMENTS

| | | | |
|---|---|---|---|
| 0314978 | 5/1989 | European Pat. Off. | |
| 63-305187 | 12/1988 | Japan | 252/67 |
| 1-103689 | 4/1989 | Japan | 252/67 |
| 108292 | 4/1989 | Japan | |

OTHER PUBLICATIONS

R. C. Downing, "Fluorocarbon Refrigerants Handbook", 17–43, 139–160 (1988).
W. Swietoslawski, "Ebulliometric Measurements", 1–17 (1945).

*Primary Examiner*—Paul Lieberman
*Assistant Examiner*—Linda D. Skaling
*Attorney, Agent, or Firm*—Colleen D. Szuch; Jay P. Friedenson

[57] ABSTRACT

Novel azeotrope-like compositions comprising 1,2-difluoroethane and dichlorotrifuoroethane which are useful in a variety of industrial applications including refrigerant applications, solvent applications, and blowing agent applications.

22 Claims, No Drawings

AZEOTROPE-LIKE COMPOSITIONS OF 1,2-DIFLUOROETHANE AND DICHLOROTRIFLUOROETHANE

FIELD OF THE INVENTION

This invention relates to azeotrope-like mixtures of 1,2-difluoroethane and dichlorotrifluoroethane. These mixtures are useful as refrigerants for heating and cooling applications, foam blowing agents, and solvents for a variety of vapor degreasing and cold cleaning applications.

BACKGROUND OF THE INVENTION

Fluorocarbon based fluids have found widespread use in industry for refrigeration, air conditioning and heat pump application.

Vapor compression is one form of refrigeration. In its simplest form, the vapor compression involves changing the refrigerant from the liquid to the vapor phase through heat absorption at a low pressure and then from the vapor to the liquid phase through heat removal at an elevated pressure. First, the refrigerant is vaporized in the evaporator which is in contact with the body to be cooled. The pressure in the evaporator is such that the boiling point of the refrigerant is below the temperature of the body to be cooled. Thus, heat flows from the body to the refrigerant and causes the refrigerant to vaporize. The vapor formed is then removed by means of a compressor in order to maintain the low pressure in the evaporator. The temperature and pressure of the vapor are then raised through the addition of mechanical energy by the compressor. The high pressure vapor then passes to the condenser whereupon heat exchanges with a cooler medium. The sensible and latent heats are removed with subsequent condensation. The hot liquid refrigerant then passes to the expansion valve and is ready to cycle again.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluorocarbons have gained widespread use in refrigeration applications including air conditioning and heat pump applications owing to their unique combination of chemical and physical properties. The majority of refrigerants utilized in vapor compression systems are either single component fluids or azeotropic mixtures. The use of azeotropic mixtures as refrigerants is known in the art. See for example, R. C. Downing, "Fluorocarbon Refrigerants Handbook", pp. 139–158, Prentice-Hall, 1988, and U.S. Pat. Nos. 2,101,993 and 2,641,579.

Azeotropic or azeotrope-like compositions are desired because they do not fractionate upon boiling or evaporation. This behavior is desirable because in the previously described vapor compression equipment with which these refrigerants are employed, condensed material is generated in preparation for cooling or for heating purposes and unless the refrigerant composition is constant boiling, fractionation and segregation will occur upon evaporation and condensation and undesirable refrigerant distribution may act to upset the cooling or heating.

Non-azeotropic mixtures have been disclosed as refrigerants, see e.g., U.S. Pat. No. 4,303,536, but have not found widespread use in commercial applications. Because nonazeotropic mixtures may fractionate during the refrigeration cycle, certain hardware changes must be made when they are used. It is primarily because of this added difficulty in changing and servicing refrigeration equipment that non-azeotropic refrigerants have been avoided. The situation is further complicated if an inadvertent leak in the system occurs during use or servicing. The composition of the mixture could change, affecting system pressures and system performance. If one component of the non-azeotropic mixture is flammable, then fractionation could shift the composition into the flammable region with potentially adverse consequences.

Trichlorofluoromethane (FC-11) has been routinely used as a refrigerant in large capacity water chillers, which are used to provide air conditioning for large buildings and industrial applications. Because dichlorotrifluoroethane (FC-123 or FC-123a) and 1,2-difluoroethane (FC-152) have boiling points greater than FC-11, they have vapor pressures less than the vapor pressure of FC-11 at the same temperature. As a result, their refrigeration capacity is less than that of FC-11. The azeotropic mixture of FC-123 and FC-152 exhibits a minimum boiling point, that is, it is more volatile than either FC-123 or FC-152 and thus possesses a greater refrigeration capacity, which more closely matches that of FC-11. Furthermore, FC-152 is flammable while FC-123 and FC-11 are nonflammable. The azeotrope-like mixtures of FC-123 and FC-152 are less flammable than FC-152 and do not segregate or fractionate upon evaporation or condensation.

Rigid polyurethane and polyisocyanurate foams are manufactured by reacting and foaming a mixture of ingredients comprising, in general, an organic isocyanate such as pure or crude toluene diisocyanate or a polymeric diisocyanate, with an appropriate amount of polyol, or mixture of polyols, in the presence of a volatile liquid blowing agent, which vaporizes during the reaction, causing the polymerizing mixture to foam. The reactivity of these ingredients is enhanced through the use of amine and/or tin catalysts and surfactant materials which serve to control and adjust cell size as well as to stabilize the foam structure during its formation.

In the production of flexible polyurethane foams water and excess diisocyanate are employed. The diisocyanate reacts with the water producing gaseous carbon dioxide which, in turn, causes foam expansion. Flexible foams are widely used as cushioning materials in items such as furniture, bedding and automobiles. Auxiliary physical blowing agents such as methylene chloride and/or trichlorofluoromethane are required in addition to the water/diisocyanate blowing mechanism in order to produce low density, soft grades of flexible polyurethane foam.

Rigid polyurethane and polyisocyanurate foams are almost exclusively expanded using trichlorofluoromethane (FC-11) as the blowing agent. Some rigid foam formulations do incorporate small amounts of water in addition to the FC-11, but the FC-11 is the major blowing agent component. Other formulations sometimes use small amounts of the more volatile dichlorodifluoromethane (FC-12) in addition to FC-11 for producing so-called froth-type foams. Rigid foams are closed-cell foams in which the FC-11 vapor is trapped in the matrix of cells. These foams offer excellent thermal insulation characteristics, due in part to the low vapor thermal conductivity of FC-11, and are used widely in thermal insulation applications such as roofing systems, building panels, refrigerators, freezers and the like.

Three important requirements for a rigid polyurethane or polyisocyanurate foam blowing agent are expansion efficiency, i.e., the gas volume generated per unit weight blowing agent; the vapor thermal conductivity of the blowing agent, and the flammability of the blowing agent. For economic reasons, a highly efficient expansion agent is preferred. A blowing agent with a low vapor thermal conductivity is also preferred as the rigid foams are often employed as thermal insulation materials and the blowing agent thermal conductivity is an important contribution to the overall foam thermal conductivity. A nonflammable blowing agent is preferred for safety reasons.

Because FC-152 has a low molecular weight, it might be considered a good blowing agent from an expansion efficiency view point, i.e., less mass of FC-152 would be required to expand the foam to the same density, compared, for example, with either FC-11 or FC-123. However, a disadvantage of using FC-152 as a blowing agent is that it is flammable and is expected to have a high vapor thermal conductivity because of its low molecular weight, both of which detract from its performance as a blowing agent.

FC-123 might be considered a good blowing agent because it is nonflammable. However, a disadvantage of FC-123 as a blowing agent is that FC-123 has a high molecular weight and as a result, FC-123 is not an efficient blowing agent. The azeotrope-like blends of FC-123 and FC-152 possess a lower molecular weight than FC-123 alone. Therefore, they are more efficient blowing agents than FC-123 alone. The azeotrope-like blends of 123/152 are also less flammable than FC-152 alone. Furthermore, the azeotrope-like blends do not fractionate or segregate upon boiling or evaporation.

The azeotropic FC-123/FC-152 mixtures, depending on the FC-152 composition, are either nonflammable or are significantly less flammable than FC-152, have improved expansion efficiency compared to FC-123 and FC-11, and have a lower thermal conductivity than FC-152. Because the mixture is an azeotrope, it will not segregate into components upon evaporation, leading to a potentially flammable situation.

Recently, non-toxic, non-flammable fluorocarbon solvents, like trichlorotrifluoroethane, have been used extensively in degreasing applications and other solvent cleaning applications. Trichlorotrifluoroethane has been found to have satisfactory solvent power for greases, oils, waxes and the like. It has therefore found widespread use for cleaning electric motors, compressors, heavy metal parts, delicate precision metal parts, printed circuit boards, gyroscopes, guidance systems, aerospace and missile hardware, aluminum parts and the like.

The solvent art has looked towards azeotropic compositions having fluorocarbon components because the fluorocarbon components contribute additional desired characteristics, such as polar functionality, increased solvency power, and stabilizers. Azeotropic compositions are desired because they do not fractionate upon boiling. This behavior is desirable because in the previously described vapor degreasing equipment with which these solvents are employed, redistilled material is generated for final rinse-cleaning. Thus, the vapor degreasing system acts as a still. Therefore, unless the solvent composition is essentially constant boiling, fractionation will occur and undesirable solvent distribution may act to upset the cleaning and safety of processing. For example, preferential evaporation of the more volatile components of the solvent mixtures, would result in mixtures with changed compositions which may have less desirable properties, such as lower solvency towards soils, less inertness towards metal, plastic or elastomer components, and increased flammability and toxicity.

The art is continually seeking new fluorocarbon based azeotrope-like mixtures which offer alternatives for refrigeration and heat pump applications; blowing agents; and solvents for vapor degreasing and cold cleaning applications. Currently, environmentally acceptable fluorocarbon-based azeotrope-like mixtures are of particular interest, because the presently used fully halogenated chlorofluorocarbons have been implicated in causing environmental problems associated with the depletion of the earth's protective ozone layer.

Mathematical models have substantiated that partially halogenated species, like dichlorotrifluoroethane and 1,2-difluoroethane will not adversely affect atmospheric chemistry, since they contribute negligibly to stratospheric ozone depletion and global warming in comparison to the fully halogenated species. Atmospheric models have shown that FC-123 possesses an ozone depletion potential and global warming potential more than 50 times lower than that of FC-11. FC-152 does not contain chlorine and thus has zero potential for stratospheric ozone depletion. The azeotrope-like mixtures of FC-123 and FC-152 therefore possess improved environmental characteristics over FC-123 alone.

R. C. Downing, in "Fluorocarbon Refrigerants Handbook", p. 140 Prentice-Hall, (1988), discloses an azeotropic mixture of FC-11 and 1,1-dichloro-2,2,2-trifluoroethane (FC-123) as a refrigerant. U.S. Pat. No. 3,940,342 discloses azeotropic mixtures of FC-11 and 1,2-dichloro-1,1,2-trifluoroethane (FC-123a).

Commonly assigned U.S. Pat. No. 4,624,970, discloses mixtures of FC-11 and FC-123 or FC-123a, to expand polyurethane-type foams. Application U.S. Ser. No.: 240,655 teaches the use of azeotrope-like mixtures comprising FC-11, FC-123 (or FC-123a) and isopentane as blowing agents for polyurethane foams.

U.S. Pat. No. 4,816,176 discloses azeotrope-like compositions of dichlorotrifluoroethane, methanol and nitromethane. U.S. Pat. No. 4,816,175 teaches the use of azeotrope-like compositions of dichlorotrifluoroethane, methanol, nitromethane, and cyclopentane as solvents. These teachings do not suggest the present azeotropic composition because, as is known in the art, no published method exists for predicting the formation of an azeotrope.

It is accordingly an object of this invention to provide novel azeotrope-like compositions based on dichlorotrifluoroethane and 1,2-difluoroethane which are useful in cooling and heating applications, foam blowing applications, and solvent cleaning applications.

Another object of the invention is to provide environmentally acceptable azeotrope-like compositions for use in the aforementioned applications.

Other objects and advantages of the invention will become apparent from the following description.

DESCRIPTION OF THE INVENTION

In accordance with the invention, novel azeotrope-like compositions have been discovered comprising dichlorotrifluoroethane and 1,2-difluoroethane which boil at about 26.3° C.±about 2° C. at 760 mm Hg. Dichlorotrifluoroethane exists in two isomeric forms: 1,1-dichloro-2,2,2-trifluoroethane (FC-123); and 1,2-dichloro-1,1,2-trifluoroethane (FC-123a). For purposes of this invention, dichlorotrifluoroethane will refer to either of the isomers or an admixture of the isomers in any proportion.

The preferred dichlorotrifluoroethane isomer is FC-123. The preferred FC-123 is "commercial FC-123" which is available as "pure FC-123" containing about 90 to about 95 weight percent FC-123, about 5 to about 10 weight percent of FC-123a, and impurities such as trichlorofluoromethane, trichlorotrifluoroethane, and methylene chloride, which due to their presence in insignificant amounts, have no deleterious effect on the properties of the azeotrope-like compositions. "Commercial FC-123" is also available as "ultra-pure" FC-123 which contains about 95 to about 99.5 weight percent FC-12, about 5 to about 0.5 weight percent of FC-123a, and possibly impurities as listed above.

When the dichlorotrifluoroethane component is 1,1-dichloro-2,2,2-trifluoroethane, novel azeotrope-like compositions have been discovered comprising 1,1-dichloro-2,2,2-trifluoroethane and 1,2-difluoroethane which boil at about 26.1° C. ±0.8° C. at 760 mm Hg.

In another embodiment, the azeotrope-like compositions of the invention comprise from about 50 to 95 weight percent 1,1-dichloro-2,2,2-trifluoroethane and from about 5 to about 50 weight percent 1,2-difluoroethane and boil at about 26.1° C.±0.8° C. at 760 mm Hg.

Preferably, the azeotrope-like compositions of the invention comprise from about 70 to about 90 weight percent 1,1-dichloro-2,2,2-trifluoroethane and from about 10 to about 30 weight percent 1,2-difluoroethane.

Our best estimate of the true azeotrope and our most preferred embodiment containing 1,1-dichloro-2,2,2-trifluoroethane is a composition which comprises about 78 weight percent 1,1-dichloro-2,2,2-trifluoroethane and about 22 weight percent 1,2-difluoroethane.

When the dichlorotrifluoroethane component is 1,2-dichloro-1,1,2-trifluoroethane, novel azeotrope-like compositions have been discovered comprising 1,2-dichloro-1,1,2-trifluoroethane and 1,2-difluoroethane which boil at about 27.2° C.±0.8° C. at 760 mm Hg.

In another embodiment, the novel azeotrope-like compositions of the invention comprise from about 50 to about 80 weight percent 1,2-dichloro-1,1,2-trifluoroethane and from about 20 to about 50 weight percent 1,2-difluoroethane and boil at about 27.2° C.±0.8° C. at 760 mm Hg.

Preferably, the azeotrope-like compositions of the invention comprise from about 60 to about 80 weight percent 1,2-dichloro-1,1,2-trifluoroethane and from about 20 to about 40 weight percent 1,2-difluoroethane.

Our best estimate of the true azeotrope and our most preferred embodiment containing 1,2-dichloro-1,1,2-trifluoroethane is a composition which comprises about 68 weight percent 1,2-dichloro-1,1,2-trifluoroethane and about 32 weight percent 1,2-difluoroethane.

When the dichlorotrifluoroethane component is a mixture of 1,1-dichloro-2,2,2-trifluoroethane and 1,2-dichloro-1,1,2-trifluoroethane, novel azeotrope-like compositions of 1,1-dichloro-2,2,2-trifluoroethane and 1,2-dichloro-1,1,2-trifluoroethane and 1,2-difluoroethane have been discovered which boil at about 25.4° C.±0.8° C. at 760 mm Hg. Preferably, the azeotrope-like compositions of the invention comprise from about 50 to about 95 weight percent of a mixture of 1,1-dichloro-2,2,2-trifluoroethane and 1,2-dichloro-1,1,2-trifluoroethane and from about 5 to about 50 weight percent 1,2-difluoroethane.

In another embodiment, the novel azeotrope-like compositions comprise from about 50 to about 90 weight percent of a mixture of 1,1-dichloro-2,2,2-trifluoroethane and 1,2-dichloro-1,1,2-trifluoroethane and from about 10 to about 50 weight percent 1,2-difluoroethane which boil at about 25.4° C.±0.8° C. at 760 mm Hg.

Our best estimate of the true azeotrope and our most preferred embodiment containing a mixture of 1,1-dichloro-2,2,2-trifluoroethane and 1,2-dichloro-1,1,2-trifluoroethane is a composition which comprises from about 70 to about 90 weight percent of a mixture of 1,1-dichloro-2,2,2-trifluoroethane and 1,2-dichloro-1,1,2-trifluoroethane and from about 10 to about 30 weight percent 1,2-difluoroethane.

The boiling point of the mixture containing both FC-123 and FC-123a along with FC-152 (25.4° C.) is lower than the boiling point of either of the other binary azeotropes. The binary FC-123 and FC-152 azeotrope boils at 26.1° C. and the FC-123a and FC-152 binary azeotrope boils at 27.2° C. This demonstrates that a ternary azeotrope forms between FC-123, FC-123a and FC-152.

The precise or true azeotrope composition has not been determined but has been ascertained to be within the indicated ranges. All compositions within the indicated ranges, as well as certain compositions outside the indicated ranges, are azeotrope-like, as defined more particularly below.

From fundamental principles, the thermodynamic state of a fluid is defined by four variables: pressure, temperature, liquid composition, and vapor composition, or P-T-X-Y, respectively. An azeotrope is a unique characteristic of a system of two or more components where X and Y are equal at a stated P and T. In practice this means that the components cannot be separated during a phase change, and therefore are useful in cooling and heating applications, foam blowing applications, and solvent applications described above.

For the purposes of this discussion, by azeotrope-like composition is intended to mean that the composition behaves like a true azeotrope in terms of its constant boiling characteristics or tendency not to fractionate upon boiling or evaporation. Thus, in such systems, the composition of the vapor formed during evaporation is identical or substantially identical to the original liquid composition. Hence, the liquid composition, if it changes at all, changes only slightly. This is contrasted with non-azeotrope-like compositions in which the liquid and vapor compositions change substantially during evaporation or condensation.

If the vapor and liquid phases have identical compositions, then it can be shown, on a rigorous thermodynamic basis, that the boiling point versus composition curve passes through an absolute maximum or an absolute minimum at this composition. If one of the two conditions, identical liquid and vapor compositions or a minimum or maximum boiling point, are shown to exist, then the system is an azeotrope, and the other condition must follow.

One way to determine whether a candidate mixture is azeotrope-like within the meaning of this invention, is to distill a sample thereof under conditions (i.e. resolution—number of plates) which would be expected to separate the mixture into its separate components. If the mixture is non-azeotropic or non-azeotrope-like, the mixture will fractionate, i.e. separate into its various components with lowest boiling component distilling off first, and so on. If the mixture is azeotrope-like, some finite amount of the first distillation cut will be obtained which contains all of the mixture components and which is constant boiling or behaves as a single substance. This phenomenon cannot occur if the mixture is not azeotrope-like, i.e. it is not part of an azeotropic system.

An equivalent method for determining whether a candidate mixture is azeotrope-like is to determine whether the boiling point versus composition curve passes through a maximum or minimum. Azeotropes which possess a minimum boiling point must also possess a maximum in the vapor pressure curve at the same composition. Because these blends exhibit positive deviations from Raoult's Law they are termed positive azeotropes. Similarly, those azeotropes which show a maximum boiling point must exhibit a minimum in the vapor pressure curve and are termed negative azeotropes owing to the negative deviations from Raoult's Law.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at different pressures, the composition of a given azeotrope will vary at least slightly as does the boiling point of the composition. Thus, an azeotrope of A and B represents a unique type of relationship but with a variable composition depending on the temperature and/or pressure. As is readily understood by persons skilled in the art, the boiling point of an azeotrope will vary with the pressure.

In one process embodiment of the invention, the azeotrope-like compositions of the invention may be used in a method for producing cooling which comprises condensing a refrigerant comprised of the azeotrope-like compositions and thereafter evaporating the refrigerant in the vicinity of the body to be cooled.

In another process embodiment of the invention, the azeotrope-like compositions of the invention may be used in a method for producing heating comprising condensing a refrigerant comprised of the azeotrope-like compositions in the vicinity of the body to be heated and thereafter evaporating the refrigerant.

In another process embodiment of the invention, the azeotrope-like compositions of the invention may be used as blowing agents for the preparation of flexible and rigid polyurethane foams as well as rigid polyisocyanurate foams by reacting and foaming a mixture of ingredients which will form the polymeric foam in the presence of said blowing agent compositions.

In still another process embodiment of the invention, the azeotrope-like compositions of the invention may be used to clean solid surfaces by treating said surfaces with said compositions in any manner well known in the art such as by dipping or spraying or use of conventional degreasing apparatus.

It is well known in the art that the polyols used in the preparation of polyurethane or polyisocyanurate foams are often blended with the blowing agent along with surfactants, catalysts, flame retardants and perhaps other components before reacting this mixture or premix with the isocyanate component to form the foam. It is also understood that depending on the period of time that the premix components will be stored before use that the inclusion of a stabilizer in the fluorocarbon/polyol premix may be advisable. With FC-11 as the blowing agent, a stabilizer is generally necessary. Examples of such stabilizers are alpha-methylstyrene and alloocimene. The stabilizer serves to inhibit the deleterious reaction between the FC-11 blowing agent and the polyol. Stabilization of fluorocarbons is also disclosed, for example, in U.S. Pat. No. 3,352,789. It is contemplated that such stabilizers may be combined with the azeotrope-like compositions of this invention when used in foam blowing applications.

It is well known in the solvent art that the use of fluorocarbon based solvents may have the undesirable result of attacking reactive metals such as zinc and aluminum, as well as certain aluminum alloys and chromate coatings such as are commonly employed in circuit board assemblies. The art has recognized that certain stabilizers, such as nitromethane, are effective in preventing metal attack by fluorocarbon based solvents. Other candidate stabilizers for this purpose, such as disclosed in the literature, are secondary and tertiary amines, olefins and cycloolefins, alkylene oxides, sulfoxides, sulfones, nitrites and nitriles, and acetylenic alcohols or ethers. It is contemplated that such stabilizers may be combined with the azeotrope-like compositions of this invention.

The 1,1-dichloro-2,2,2-trifluoroethane, 1,2-dichloro-1,1,2-trifluoroethane and the 1,2-difluoroethane components of the invention are known materials. Preferably, except for the "commercial FC-123" and its impurities, the materials should be used in sufficiently high purity so as to avoid the introduction of adverse influences upon the constant boiling properties of the system.

It should be understood that the present compositions may include additional components so as to form new azeotrope-like compositions. Any such compositions are considered to be within the scope of the present invention as long as the compositions are essentially constant boiling and contain all of the essential components described herein.

The azeotrope-like compositions of the invention may also include additional components that may not form azeotrope-like compositions. For example, when the compositions of the invention are used as solvents or blowing agents, they may also include stabilizers as discussed above, while in refrigerant applications they may include lubricants.

The present invention is more fully illustrated by the following non-limiting Examples.

EXAMPLE 1

This example shows that a minimum in the boiling point versus composition curve occurs in the region of about 78 weight percent 1,1-dichloro-2,2,2-trifluoroethane and about 22 weight percent 1,2-difluoroethane, indicating that an azeotrope forms in the neighborhood of this composition.

The temperature of boiling liquid mixtures was measured using an ebulliometric technique similar to that described by W. Swietoslawski in Ebulliometric Measurements, Reinhold Publishing Corp., (1945). The ebulliometer consisted of a spherical flask which was charged with a measured amount, generally 3-6 cm$^3$, of the FC-123. The flask was partially submerged in a constant temperature bath which served to heat the liquid contained in the flask; the liquid was stirred vigorously with a magnetic stirrer. The temperature of the boiling system was measured using either a quartz-sheathed platinum resistance thermometer or a glass-sheathed thermistor which had been calibrated against a platinum resistance thermometer standard. In each case the temperature detector was placed just above the surface of the boiling liquid and was continually washed with condensed vapor. The system was operated under total reflux and temperature measurements, accurate to ±0.0° C., recorded after steady state was attained. The prevailing barometric pressure was also recorded. Boiling point versus composition data were obtained by titrating measured aliquots of 1,2-difluoroethane into the ebulliometer, using either a manual syringe or a microprocessor controlled syringe.

The following Table shows the boiling point measurements, at 737 mm Hg, for various mixtures of FC-123 and FC-152. Interpolation of these data indicates that a minimum in the boiling point versus composition curve occurs at about 78 weight percent FC-123 and about 22 weight percent FC-152, although the mixtures are constant boiling, to within 0.8° C., in the region of about 50 to about 95 weight percent FC-123 and from about 5 to about 50 weight percent FC-152. The boiling point of the FC-123/FC-152 azeotrope at 760 mm Hg is 26.1° C.

EXAMPLE 2

The temperature of the boiling mixture was measured using ebulliometry as outlined in Example 1 above, except that the ebulliometer was charged with a measured quantity of FC-123a instead of FC-123. The results of these measurements are summarized in Table II. These data show that a minimum in the boiling point occurs in the region from about 50 to about 80 weight percent FC-123a and from about 20 to about 50 weight percent FC-152. The best estimate of the azeotropic composition is about 68 weight percent FC-123a and about 32 weight percent FC-152. The blends are constant boiling within about ±0.8° C. over the range from about 50 to about 80 weight percent FC-123a and from about 20 to about 50 weight percent FC-152. The boiling point of the FC-123a/F-152 azeotrope is 27.2° C. at 760 mm Hg.

TABLE I

| Liquid Mixture (parts by weight) | | Boiling Point at 737 mm Hg (°C.) |
|---|---|---|
| 1,1-dichloro-2,2,2-trifluoro-ethane | 1,2-difluoroethane | |
| 100.0 | 0.00 | 27.10 |
| 97.5 | 2.5 | 26.55 |
| 95.1 | 4.9 | 26.15 |
| 92.8 | 7.2 | 25.80 |
| 90.6 | 9.4 | 25.62 |
| 88.6 | 11.4 | 25.50 |
| 86.4 | 13.4 | 25.39 |
| 84.7 | 15.3 | 25.35 |
| 82.9 | 17.1 | 25.29 |
| 81.2 | 18.8 | 25.27 |
| 79.5 | 20.5 | 25.26 |
| 77.9 | 22.1 | 25.26 |
| 76.4 | 23.6 | 25.26 |
| 74.9 | 25.1 | 25.27 |
| 73.5 | 26.5 | 25.27 |
| 72.1 | 27.9 | 25.30 |
| 70.8 | 29.2 | 25.32 |
| 68.3 | 31.7 | 25.38 |
| 67.1 | 32.9 | 25.40 |
| 66.0 | 34.0 | 25.45 |
| 64.9 | 35.1 | 25.49 |

TABLE I-continued

| Liquid Mixture (parts by weight) | | Boiling Point at 737 mm Hg (°C.) |
|---|---|---|
| 1,1-dichloro-2,2,2-trifluoro-ethane | 1,2-difluoroethane | |
| 61.8 | 39.2 | 25.57 |

TABLE II

| Liquid Mixture (parts by weight) | | Boiling Point at 760 mm Hg (°C.) |
|---|---|---|
| 1,1-dichloro-2,2,2-trifluoro-ethane | 1,2-difluoroethane | |
| 100.0 | 0.00 | 29.93 |
| 90.7 | 9.30 | 28.31 |
| 75.4 | 24.6 | 27.30 |
| 74.1 | 25.9 | 27.27 |
| 72.8 | 27.2 | 27.26 |
| 71.5 | 28.5 | 27.24 |
| 70.2 | 29.8 | 27.24 |
| 69.0 | 31.0 | 27.24 |
| 67.9 | 32.1 | 27.23 |
| 66.8 | 33.2 | 27.23 |
| 66.5 | 33.5 | 27.23 |
| 61.3 | 38.7 | 27.28 |

EXAMPLE 3

The temperature of the boiling liquid mixtures was recorded using ebulliometery as outlined in Example 1 above, except that the ebulliometer was charged with a measured quantity of a blend of 95.7 weight percent FC-123 and 4.3 weight percent FC-123a, simulating a "commercial FC-123". The results of these measurements are summarized in Table III. These data show that a minimum in the boiling point occurs in the region of about 23 weight percent FC-152. The mixture is constant boiling within ±0.1° C. over the range measured. The boiling point of this three component blend, FC-123/FC-123a/FC-152, is 25.4° C. at 760 mm Hg which is lower than either of the two binary azeotropes, FC-123/FC-152 and FC-123a/FC-152; indicating that a minimum boiling ternary azeotrope forms between FC-123, FC-123a and FC-152.

TABLE III

| Liquid Mixture (parts by weight) | | Boiling Point at 737 mm Hg (°C.) |
|---|---|---|
| 1,1-dichloro-2,2,2-trifluoro-ethane | 1,2-difluoroethane | |
| 81.9 | 18.1 | 25.46 |
| 79.8 | 20.2 | 25.44 |
| 78.5 | 21.5 | 25.43 |
| 76.7 | 23.3 | 25.42 |
| 75.2 | 24.8 | 25.43 |
| 74.0 | 26.0 | 25.43 |
| 72.9 | 27.1 | 25.44 |
| 71.9 | 28.1 | 25.45 |
| 67.8 | 32.2 | 25.48 |
| 65.1 | 34.9 | 25.51 |

EXAMPLE 4

This example shows that azeotrope-like 1,1-dichloro-2,2,2-trifluoroethane and 1,2-difluororethane blends have certain performance advantages compared to other refrigerants which are currently used in certain air conditioning cycles.

The theoretical performance of a refrigerant at specific operating conditions can be estimated from the thermodynamic properties of the refrigerant using standard refrigeration cycle analysis techniques. See, e.g., R. C. Downing, "Fluorocarbon Refrigerants Handbook", ch. 3, Prentice-Hall, (1988). The coefficient of performance (COP) is a universally accepted measure, especially useful in representing the relative thermodynamic efficiency of a refrigerant in a specific heating or cooling cycle involving evaporation or condensation of the refrigerant. In refrigeration engineering this term expresses the ratio of useful refrigeration to the energy applied by the compressor in compressing the vapor. The capacity of a refrigerant represents the volumetric efficiency of the refrigerant. To a compressor engineer this value expresses the capability of a compressor to pump quantities of heat for a given volumetric flow rate of refrigerant. In other words, given a specific compressor, a refrigerant with a higher capacity will deliver more cooling or heating power. We have performed this type of calculation for a chiller-type air conditioning cycle with a condenser temperature of 100° F., and an evaporator temperature of 35° F. We have further assumed isentropic compression and a compressor inlet temperature of 50° F. Such calculations were performed for an 85/15 by weight blend of FC-123 and FC-152, as well as for the single component refrigerants FC-11, FC-123, FC-123a and FC-152. FC-11 has been routinely used for this type of air conditioning application.

Table IV lists the COP and capacity of the FC-123/FC-152 azeotrope-like blend relative to that of FC-11, as well as the COP and capacity of FC-123, FC-123a and FC-152, again relative to FC-11. The table also lists the evaporator and condenser pressures.

EXAMPLE 5

The COP and capacity of azeotrope-like compositions of 1,2-dichloro-1,1,2-trifluoroethane and 1,2-difluoroethane are evaluated in accordance with Example 4, above. The results obtained are substantially the same as those for FC-123/FC-152, i.e., FC-123a/FC-152 azeotropic blends provide modest improvements in COP compared to that of FC-11, and also provide a capacity within 10% of FC-11. The azeotropic mixture is also a more efficient refrigerant than the single components as indicated by the COP.

TABLE IV

| Refrigerant | Evaporator Pressure (psia) | Condenser Pressure (psia) | COP* | Capacity* |
|---|---|---|---|---|
| FC-11 | 6.25 | 23.46 | 1.00 | 1.00 |
| FC-123/FC-152 | 5.23 | 22.01 | 1.01 | 0.915 |
| FC-123 | 5.14 | 20.77 | 0.99 | 0.845 |
| FC-123a | 4.75 | 20.05 | 0.98 | 0.795 |
| FC-152 | 3.82 | 17.29 | 0.97 | 0.692 |

*Relative to FC-11

The data listed in this table show that the FC-123/FC-152 azeotrope blend provides a modest improvement in COP compared to that attainable with FC-11, and also provides a capacity within 10% of FC-11. The capacity of the azeotropic mixture is much closer to that of FC-11 than either of the single components, FC-123, FC-123a and FC-152. The azeotropic mixture is also a more efficient refrigerant than the single components as indicated by the COP.

EXAMPLES 6-7

The capabilities of FC-123 and FC-123a as blowing agents is evaluated. The following test is conducted first using FC-123 as the blowing agent and then repeated using FC-123a as the blowing agent. Toluene diisocyanate is mixed with an appropriate amount of polyol in the presence of dichlorotrifluoroethane, causing the polymerizing mixture to foam. The results indicate that FC-123 and FC-123a are both useful blowing agents in a variety of foam applications.

EXAMPLES 8-9

The azeotrope-like compositions of the invention are used in a vapor degreaser to evaluate the solvent cleaning properties of the compositions. The following test is performed first using azeotrope-like compositions of the invention containing FC-123 as the dichlorotrifluoroethane component. The test is then repeated using azeotrope-like compositions containing FC-123a.

A part to be cleaned is immersed in a sump of boiling solvent. Thereafter, the part is immersed in a sump containing freshly distilled solvent near room temperature. Finally, the part is exposed to solvent vapors over the boiling sump which condense on the cleaned part. A clean part emerges from the vapor degreaser indicating that the azeotrope-like compositions of the invention have good solvent capabilities.

Generally partially chlorinated solvents such as FC-123 are more agressive towards plastic materials than hydro-fluorinated solvents, such as FC-152. It is known that FC-123 is a more aggressive solvent towards plastics and elastomers than FC-11. Dilution of the FC-123 with the less aggressive FC-152 will improve the compatibility properties compared to 100% FC-123.

Having described the invention in detail and by reference to preferred embodiments thereof, it will be apparent that modifications and variations are possible without departing from the scope of the invention defined in the appended claims.

What is claimed is:

1. The azeotrope-like compositions consisting essentially of from about 50 to about 95 weight percent 1,1-dichloro-2,2,2-trifluoroethane and from about 5 to about 50 weight percent 1,2-difluoroethane and boil at about 26.1° C. at 760 mm Hg.

2. The azeotrope-like compositions of claim 1 wherein said compositions consist of essentially from about 70 to about 90 weight percent 1,1-dichloro-2,2,2-trifluoroethane and from about 10.0 to about 30.0 weight percent 1,2-difluoroethane and boil at about 26.1° C. at 760 mm Hg.

3. The azeotrope-like compositions of claim 1 wherein said compositions consist essentially of about 78 weight percent 1,1-dichloro-2,2,2-trifluoroethane and about 22 weight percent 1,2-difluoroethane and boil at about 26.1° C. at 760 mm Hg.

4. Azeotrope-like compositions of claim 3 wherein said compositions consist consisting essentially of from about 50 to about 80 weight percent 1,2-dichloro-1,1,2-trifluoroethane and from about 20 to about 50.0 weight percent 1,2-difluoroethane and boil at about 27.2° C. at 760 mm Hg.

5. The azeotrope-like compositions of claim 4 wherein said compositions consist essentially of from about 60 to about 80.0 weight percent 1,2-dichloro-1,1,2-trifluoroethane and from about 20.0 to about 40.0 weight percent 1,2-difluoroethane and boil at about 27.2° C. at 760 mm Hg.

6. The azeotrope-like compositions of claim 4 wherein said compositions consist essentially of about 68 weight percent 1,2-dichloro-1,1,2-trifluoroethane and about 32 weight percent 1,2-difluoroethane and boil at about 27.2° C. at 760 mm Hg.

7. Azeotrope-like compositions consisting essentially of from about 50 to about 95 weight percent of a mixture of 1,1-dichloro-2,2,2-trifluoroethane and 1,2-dichloro-1,1,2-trifluoroethane and from about 5 to about 50 weight percent 1,2-difluoroethane and boil at about 25.4° C. at 760 mm Hg.

8. The azeotrope-like compositions of claim 7 wherein said compositions consist essentially from about 70 to about 90 weight percent of a mixture of 1,1-dichloro-2,2,2-trifluoroethane and 1,2-dichloro-1,1,2-trifluoroethane and from about 10 to about 30 weight percent 1,2-difluoroethane and boil at about 25.4° C. at 760 mm Hg.

9. Azeotrope-like compositions consisting essentially of from about 50 to about 95 weight percent of a mixture of 1,1-dichloro 2,2,2-trifluoroethane and 1,2-dichloro-1,1,2-trifluoroethane and from about 5 to about 50 weight percent 1,2-difluoroethane and boil at about 25.4° C.±0.8° C. at 760 mm Hg.

10. The azeotrope-like compositions of claim 7 wherein said compositions consist essentially of from about 50 to about 90 weight percent of a mixture of 1,1-dichloro-2,2,2-trifluoroethane and 1,2-dichloro-1,1,2-trifluoroethane and from about 10 to about 50 weight 1,2-difluoroethane.

11. A method for producing cooling comprising condensing the refrigerant composition of claim 1 and thereafter evaporating said composition in the vicinity of a body to be cooled.

12. A method for producing cooling comprising condensing the refrigerant composition of claim 4 and thereafter evaporating said composition in the vicinity of a body to be cooled.

13. A method for producing cooling comprising, condensing the refrigerant composition of claim 7 and thereafter evaporating said composition in the vicinity of a body to be cooled.

14. A method for producing heating comprising condensing the refrigerant composition of claim 1 in the vicinity of a body to be heated and thereafter evaporating said composition.

15. A method for producing heating comprising condensing the refrigerant composition of claim 4 in the vicinity of a body to be heated and thereafter evaporating said composition.

16. A method for producing heating comprising condensing the refrigerant composition of claim 7 in the vicinity of a body to be heated and thereafter evaporating said composition.

17. A method for preparing polyurethane and polyisocyanurate foams comprising reacting and foaming a mixture of ingredients which will react to form the polyurethane and polyisocyanurate foams in the presence of a blowing agent composition of claim 1.

18. A method for preparing polyurethane and polyisocyanurate foams comprising reacting and foaming a mixture of ingredients which will react to form the polyurethane and polyisocyanurate foams in the presence of a blowing agent composition of claim 4.

19. A method for preparing polyurethane and polyisocyanurate foams comprising reacting and foaming a mixture of ingredients which will react to form the polyurethane and polyisocyanurate foams/in the presence of a blowing agent composition of claim 7.

20. A method of cleaning a solid surface comprising treating said surface with an azeotrope-like composition of claim 1.

21. A method of cleaning a solid surface comprising treating said surface with an azeotrope-like composition of claim 4.

22. A method of cleaning a solid surface comprising treating said surface with an azeotrope-like composition of claim 7.

* * * * *